United States Patent Office 3,131,147
Patented Apr. 28, 1964

3,131,147
PROCESS FOR IMPARTING A SOFT HANDLE TO TEXTILE MATERIALS AND AQUEOUS DISPERSIONS SUITABLE THEREFOR
Armin Hiestand, Binningen, Switzerland, assignor to Ciba Limited, Basel, Switzerland, a Swiss firm
No Drawing. Filed June 13, 1960, Ser. No. 35,430
Claims priority, application Switzerland June 16, 1959
14 Claims. (Cl. 252—8.75)

The present invention is based on the observation that it is possible to impart a soft handle to textile materials in an advantageous manner by treatment with an aqueous dispersion of polyalkylene polyamines highly acylated with radicals of higher aliphatic carboxylic acids, more especially of compounds of the formula (1)

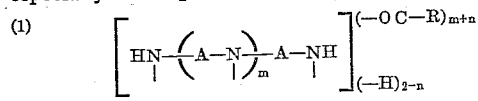

in which A represents a lower alkylene radical; R a higher aliphatic hydrocarbon radical, and $m$ and $n$ represent whole numbers, $m$ being at most $=3$ and $n$ at most $=2$, there being present at least partially a compound of this formula in which $n=2$.

The present process can be applied to a wide variety of textile materials. As examples may be mentioned:

Natural fibers of animal origin, such as wool or silk,
Natural fibers of vegetable origin, more especially cellulose fibers such as cotton or linen,
Semi-synthetic fibers, for example of cellulose ethers or cellulose esters such as cellulose nitrate or cellulose acetate, among which cellulose triacetate deserves to be mentioned especially,
Fully synthetic fibers, for example of polyacrylonitrile, polyurethane, polyamides of ε-caprolactam or of adipic acid and hexamethylene diamine, polyester fibers, more especially of terephthalic acid polyglycol ester.

It is of course also possible to treat fibers of copolymers or co-condensates as well as blended fibers, for example of natural and synthetic fibers such as wool and polyamide, wool and polyacrylonitrile, or wool and polyester fibers. The fiber material can be treated at any stage of its processing, for example in the form of loose fibers, hanks, yarn, woven or knitted fabrics.

In this connection the term "polyalkylene polyamines acylated with radicals of higher carboxylic acids" refers to acyl derivatives or dialkylene triamines, trialkylene tetramines and higher polyamines most of whose nitrogen atoms carry acyl groups. At least an essential portion for example at least 20%, of the product used in the present process, should consist of an acyl compound or compounds, all acylatable nitrogen atoms of which contain acyl groups so that in the portion consisting of this compound or these compounds no basic nitrogen atoms are present. Some nitrogen atoms, more especially the terminal ones, may also contain alkyl groups instead of or preferably in addition to acyl groups.

Thus, the acyl compounds to be used in the present process may correspond, for example, to the general formula (2)

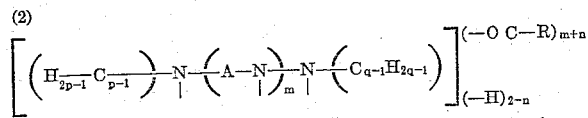

in which A stands for a lower alkylene radical, R for a higher aliphatic hydrocarbon radical, $m$, $n$, $p$ and $q$ are whole numbers, $m$ being at most $=3$ and $n$ at most $=2$, there being present at least partially a compound in which $n=2$.

Preferred use is made of compounds of the Formula 1, which contain polyalkylene polyamine radicals of the composition (3)

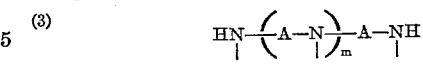

in which A stands for a lower alkylene radical, for example a propylene radical ($-CH_2-CH_2-CH_2-$) or preferably for an ethylene radical ($-CH_2-CH_2-$) and $m=1$, 2 or 3. Accordingly, the compounds of the Formula 1 are derivatives of dialkylenetriamines ($m=1$), trialkylenetetramines ($m=2$) or tetraalkylenepentamines ($m=3$).

The acyl compounds of the Formulae 1 and 2 can be prepared from suitable amines of the formulae (4)  or (5) 

in which A, $m$, $p$ and $q$ have the above meanings—by reaction with a carboxylic acid of the formula (6)     HOOC—R in which R represents a higher aliphatic radical. It is of advantage to use a saturated higher fatty acid of the formula (7)

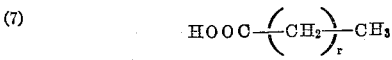

in which $r$ is a whole, preferably even, number from 12 to 20, thus, for example myristic, palmitic, stearic, arachidic or behenic acid. It is by no means necessary to subject the polyamine to a unitary acylation; in fact the acylation can be performed very well with a mixture of higher fatty acids, for example mixtures of different fatty acids of the Formula 7 which may also contain a certain share of unsaturated acids, such as oleic acid. [This applies equally to the Formulae 1 and 2; that is to say the radicals —OC—R present in a molecule of these compounds need not all be identical.] Thus, the acylation can be carried out, inter alia, with so-called commercial stearic acid which consists substantially of stearic acid and contains also other higher fatty acids, more especially palmitic acid and a small amount of oleic acid and whose average molecular weight is about 270.

To achieve the extensive acylation required it is in general necessary to heat the polyamines together with the carboxylic acid for a prolonged period at an elevated temperature. It is of advantage to raise the temperature gradually, for example, the reaction mixture is first heated for several hours at a temperature of about 140–170° C. and then likewise for several hours at a temperature of 200–250° C. Even when the molecular ratio polyamine:acid is selected so that for each basic nitrogen atom one acid molecule is available (that is to say for example 3 mols of stearic acid for 1 mol of diethylenetriamine, or a slight excess of stearic acid over and above 3 mols) the product obtained as a rule is even under the above-mentioned energetic conditions not a unitary, completely acylated polyamine but a mixture which contains in addition to completely acylated amine, for example triacyl-diethylenetriamine or tetraacetyl-triethylenetetramine, a considerable share of amine salt formed from carboxylic acid and amine that has not yet been completely acylated so that it is still basic.

The resulting acyl compounds to be used in the present process have in general a melting point of over 100° C. and an appearance which resembles that of a hard wax. The preparation of fine, smooth and stable dispersions of these compounds in water, such as are required in the present process, is not a very simple matter. It is of advantage to use for this purpose a non-ionic dispersant, more especially a polyglycol compound which may be derived, for example, from a higher amine or alcohol and contains advantageously a relatively long chain of —CH$_2$—CH$_2$—O— groups, for example a chain consisting of 50 to 250 such groups.

Mixtures of such non-ionic dispersants are likewise suitable. Thus, for example, good results are achieved by using an adduct of about 60 to 100 mols of ethylene oxide with a higher alcohol, such as oleyl alcohol, or a higher fatty amine, such as oleylamine, and additionally an adduct of about 150 to 250 mols of ethylene oxide with a higher alcyclic alcohol or amine, such as hydroabietyl alcohol or hydroabietylamine.

Since the acyl compounds used in the preparation of the aqueous dispersions as a rule melt above 100° C., and this preparation is facilitated or even made possible only when the acyl compounds in the liquid state can be brought into the requisite fine dispersion in water, it is of advantage to add to the acylamino compounds before their dispersion a substance that causes their melting point to drop below 100° C. This enables the liquid acyl compounds to be dispersed in water, at least when warm or hot water is used. Substances suitable for lowering the melting point are above all inert organic solvents having a high boiling point such, for example, as xylenes or mixtures of xylenes, decahydronaphthalene, chlorobenzene, dichlorobenzenes, benzyl chloride, trichloroethylene, glycol monoethyl ether or diglycol monoethyl ether.

The dispersions to be used in the present process may also contain further substances, for example nitrogenous bases such as ammonia, higher fatty acids such as stearic acid, or the corresponding salts. It is of special advantage to perform the process in the presence of an anionactive dispersant, as which may be mentioned more especially condensation products of naphthalenesulfonic acids with formaldehyde.

The amounts of substances contained in the dispersion may vary within wide limits. It will be readily understood that, apart from water, the active principle proper, that is to say the acyl compound, should preponderate in these dispersions. The substances which reduces the melting point should be used in a rather smaller amount though advantageously still of the same order. For example: 20–100 parts of such a substance are used for every 100 parts of acyl compound. The amount of non-ionic and if desired anion-active dispersants used should be for example 5–60% of the weight of the acyl compound. When the dispersion is to be used for triacetate or polyester fibers it should contain in addition to a non-ionic dispersant also at least one anion-active dispersant in an amount of 0.5–10% of the weight of the acyl compound present.

The dispersion is prepared for example as follows:

A melt containing the acyl compounds, the substance that reduces the melting point and if desired further substances such as free fatty acid, and whose temperature is at most about 100° C., is stirred into a hot aqueous solution containing the non-ionic dispersant or dispersants and any other dissolved substances, for example the anion-active dispersant, rapid and thorough mixing being ensured, for example, with a high-speed stirrer. Alternatively, the anion-active dispersant can be added subsequently. By adding water, advantageously while the reaction mixture is still warm, the dispersion can be adjusted to a specific strength.

The resulting dispersions have good stability and can be diluted to the desired strength with cold or at least with hot water. These baths can be used to treat the textile materials in the conventional manner. Depending on the fiber material concerned it may be of advantage to treat it at a higher or lower temperature. Thus, for example, the following treatment temperatures are suitable: Wool or polyamide fibers 20–30° C.; cotton 20–40° C.; polyacrylonitrile and cellulose triacetate at 30–60° C.; polyester fibers with advantage 90–100° C.

However, these temperatures are simply examples, and in a given case good results may also be achieved at other temperatures. The amount is selected for example so that at the usual goods-to-liquor ratio of 1:20 to 1:40, the amount of (concentrated) dispersion added is such that the bath contains about 0.1 to 2% (calculated on the weight of the fiber material) of acyl compounds. In general it is of advantage to add an acid, more especially formic acid. The treatment—more especially when it is carried out at a low temperature—should not be discontinued too soon and should be performed, for example, for 15 minutes to 2 hours. This ensures the fixation of the acyl compounds on the fiber material and a good and lasting soft handle is imparted to the latter.

Unless otherwise indicated, parts and percentages in the following examples are by weight.

EXAMPLE 1

A. Manufacture of the Acyl Compounds

A mixture of 103 parts (1 mol) of diethylenetriamine and 810 parts (3 mols) of commercial stearic acid having a molecular weight of 270 is slowly heated to 140 to 145° C. while being stirred under nitrogen. When this temperature has been reached, the melt foams only little. After another 3 hours the melt is heated to 160 to 165° C. and this temperature is maintained for 4½ hours. After cooling, there are obtained about 861 parts of a brittle, pale-yellow, waxy substance which melts at 93–94° C. and, as revealed by titration with 0.1 N-perchloric acid in glacial acetic acid, still contains 0.6 gram atom of basic nitrogen. The content of free stearic acid, calculated from the acid number of 38.2, is 0.59 mol (condensation product No. 1).

The condensation product No. 1 obtained in the manner described above is heated for another 18 hours at 215–220° C. The content of free stearic acid, calculated from the acid number of 13.45, is 0.15 mol. A brittle, waxy substance melting at 98 to 100° C. is obtained (condensation product No. 2).

B. Preparing the Dispersion

The apparatus used is an open stirring vessel equipped with a blade stirrer of stainless steel which has a strong downward beating action towards the bottom of the vessel and the speed of which can be raised to 6000 revolutions per minute. A solution heated to at least 90° C., containing 1.5 parts of an adduct of 200 mols of ethylene oxide and 1 mol of hydroabietyl alcohol; 0.75 part of an adduct of 80 mols of ethylene oxide and 1 mol of oleyl alcohol; 0.75 part of a condensation product, neutralized with aqueous sodium hydroxide solution, of naphthalene sulfonic acid and formaldehyde, and 20 parts of water is caused by stirring to circulate in the aforementioned apparatus. There are then added to the solution 2.5 parts of aqueous ammonia of 25% strength and then 12.5 parts of a melt heated to at least 95° C. of 2.5 parts of ethylene glycol monoethyl ether, 1 part of stearic acid and 9 parts of the condensation product of 1 mol of diethylene triamine and 3 mols of stearic acid prepared as described above under A (condensation product No. 2) at a rate such that the added melt is immediately absorbed. While pouring in the melt the speed of the stirrer, which initially is relatively low, must be continually increased. On completion of the addition the mixture is stirred very rapidly until a smooth dispersion has been obtained. Another 62 parts of water of condensation having a temperature 70° C. are then added and the stirrer is considerably slowed down. The hot dispersion is then adjusted with hot water to a weight of 100 parts, again homogenized for a short time and then left to itself until it has cooled completely. A very thinly liquid, highly colloidal dispersion is obtained which is very easy to filter. It can be diluted with hot or with cold water.

In an identical manner a dispersion can be prepared from condensation product No. 1.

C. Finishing of the Fiber Material (a) *Polyacrylonitrile fibers.*—100 parts of polyacrylonitrile fiber yarn are treated for 30 minutes at 40° C. with 3000 parts of a liquor containing 1 to 2 parts of the dispersion described under B above and 3 parts of concentrated formic acid. After having been centrifuged and dried at about 60° C., the yarn has a soft handle.

(b) *Cellulose triacetate fibers.*—Cellulose triacetate fiber yarn is treated as described above under (a), whereupon it has likewise a soft handle.

(c) *Polyester fibers.*—100 parts of yarn or fabric of terephthalic acid polyglycol ester are treated for ½ to 1½ hours at the boil in a bath containing in 3000 parts of water 2 to 4 parts of the dispersion described above under B and 3 parts of concentrated formic acid, then centrifuged and dried. The fiber material treated in this manner has a soft handle.

(d) *Cotton.*—When cotton yarn is treated at 25° C. as described above under (a), it displays a soft handle without having turned yellow.

(e) *Polyamide fibers.*—When 100 parts of yarn of polyamide fibers are treated for 30 minutes at 20° C. in a bath containing in 3000 parts 2 to 4 parts of the dispersion described above under B and 3 parts of concentrated formic acid, it displays a soft handle. In the same manner a soft handle can also be imparted to (f) *Wool.*

EXAMPLE 2

The condensation products Nos. 3 to 19 listed under A in the following table can be prepared as described in Example 1 under A for condensation product No. 2.

By the method described under B in Example 1 stable dispersions can be prepared from the resulting condensation products with the use of the solvents listed in the table under B (Example 1: Ethylene glycol monoethyl ether), of the non-ionic dispersant (Example 1: Adduct of ethylene oxide and oleyl alcohol, and adduct of ethylene oxide and abietyl alcohol), and of the anion-active dispersant (as in Example 1: Condensation product from naphthalene sulfonic acid and formaldehyde). It is of advantage to add also ammonia and stearic acid or another higher fatty acid as mentioned in Example 1.

Textile fibers can be softened with these dispersions as described under (a) to (f) under C in Example 1.

The figures shown in the table indicate the number of parts of the substance concerned required for the preparation of 100 parts of dispersion.

| Number | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| A. Condensation product prepared from 1 mol diethylenetriamine+3 mols stearic acid: | | | | | | | | | | | | | | | | | | | |
| As in Ex. 1 A, para. 1 | | | 18 | | | | | | 9 | 9 | 18 | 18 | 18 | 18 | 18 | 18 | 18 | 18 | 18 |
| As in Ex. 1 A, para. 2 | 9 | 10 | | | | | | | | | | | | | | | | | |
| Analogous cond. prods. prepared as in Ex. 1A, para. 2 from: | | | | | | | | | | | | | | | | | | | |
| 1 mol diethylenetriamine+3 mols myristic acid | | | | 18 | | | | | | | | | | | | | | | |
| 1 mol diethylenetriamine+3 mols palmitic acid | | | | | 18 | | | | | | | | | | | | | | |
| 1 mol diethylenetriamine+3 mols behenic acid | | | | | | 18 | | | | | | | | | | | | | |
| 1 mol triethylenetetramine+4 mols stearic acid | | | | | | | 18 | | | | | | | | | | | | |
| 1 mol tetraethylenepentamine+5 mols stearic acid | | | | | | | | 18 | | 9 | | | | | | | | | |
| Ethylene-di-stearoylamide | | | | | | | | | | | | 9 | | | | | | | |
| Phenylene-di-stearoylamide | | | | | | | | | | | | | | | | | | | |
| Stearic acid | 1 | | | | | | | | | | | | | | | 18 | | | |
| B. Solvent: | | | | | | | | | | | | | | | | | | | |
| Xylene | | | | | | | | | | | | | | | 18 | | | | |
| Decalin | | | | | 18 | | | | | | | | | | | | | 18 | 18 |
| Chlorobenzene | | | | 18 | | 18 | 18 | 18 | 18 | 18 | | | | | | | | | |
| o-Dichlorobenzene | | | | | | | | | | | 18 | | | | | | | | |
| Benzyl chloride | | | | | | | | | | | | 18 | | | | | | | |
| Trichloroethylene | | | | | | | | | | | | | | | | 5 | 5 | | |
| Ethylene glycol monoethyl ether | 2.5 | 2.5 | 5 | | | | | | | | | | | | 18 | | | | |
| Diethylene glycol monoethyl ether | | | | | | | | | | | | | | | | | | | |
| C. Non-ionic dispersants, Adduct of: | | | | | | | | | | | | | | | | | | | |
| 80 mols ethylene oxide+1 mol oleyl alcohol | 0.75 | 0.75 | 1.5 | 3 | 3 | 3 | 3 | 3 | 3 | 3 | 3 | 3 | 3 | 3 | 3 | | | 9 | |
| 80 mols ethylene oxide+1 mol oleylamine | | | | | | | | | | | | | | | | 1.5 | 3 | | |
| 200 mols ethylene oxide+1 mol hydroabietyl alcohol | 1.5 | 1.5 | 3 | 6 | 6 | 6 | 6 | 6 | 6 | 6 | 6 | 6 | 6 | 6 | 6 | 3 | | | |
| 200 mols ethylene oxide+1 mol hydrogenated abietylamine | | | | | | | | | | | | | | | | | .6 | | |
| D. Anion-active dispersant: Neutralized cond. prod. of naphthalenesulfonic acid and formaldehyde | 0.75 | 0.75 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 |

EXAMPLE 3

If the adduct of 200 mols of ethylene oxide and 1 mol of hydroabietyl alcohol in the dispersion of columns 1 and 3 in Example 2 is replaced by the same quantity of (a) An adduct of 200 mols of ethylene oxide and 1 mol of hydroabietyl alcohol, cross-linked with about 1% of hexamethylene diisocyanate, or (b) An adduct of 100 mols of ethylene oxide and 1 mol of hydroabietyl alcohol, cross-linked with about 1.5% of diphenylmethane diisocyanate, or (c) An adduct of 80 mols of ethylene oxide and 1 mol of oleyl alcohol, cross-linked with about 1% hexamethylene diisocyanate, very stable, highly colloidal emulsions are obtained, having a higher viscosity than the corresponding ones described in Example 2.

What is claimed is:

1. Process for imparting a soft handle to textile materials which comprises treating the materials with an aqueous dispersion of a mixture of compounds of the formulae (a)
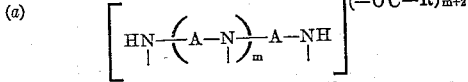

and (b)
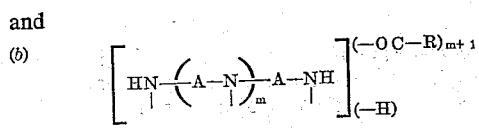

in which A represents a lower alkylene radical, R a higher aliphatic hydrocarbon radical, and $m$ is a whole number of at most 3, the compound of Formula $a$ being present in an amount of at least 20% and in an effective amount.

2. Process for imparting a soft handle to textile materials which comprises treating the materials with an aqueous dispersion of a mixture of compounds of the formulae (a) 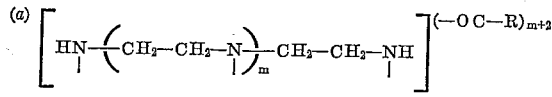

and (b) 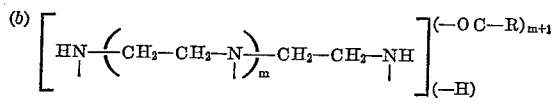

in which R represents a higher aliphatic hydrocarbon radical, and $m$ is a whole number of at most 3, the compound of Formula $a$ being present in an amount of at least 20% and in an effective amount in said mixture.

3. Process for imparting a soft handle to textile materials which comprises treating the materials with an aqueous dispersion of a mixture of compounds of the formulae (a) 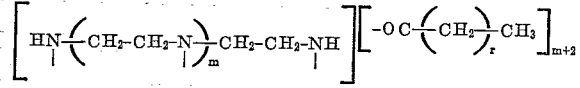

and (b) 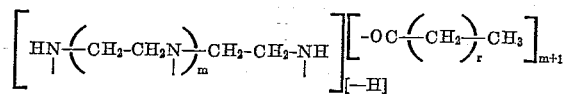

in which $m$ and $r$ are whole numbers, $m$ being at most $=3$, $r$ at least $=12$ and at most $=20$, the compound of Formula $a$ being present in an amount of at least 20% and in an effective amount.

4. Process for imparting a soft handle to textile materials which comprises treating the materials with an aqueous dispersion of a mixture of compounds of the formulae (a) 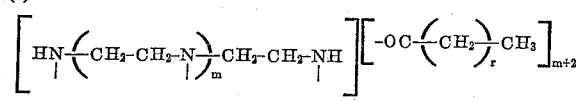

and (b) 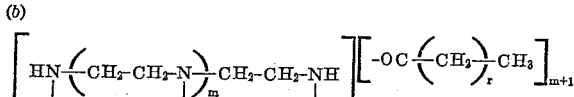

in which $m$ and $r$ are whole numbers, $m$ being at most $=3$, $r$ at least $=12$ and at most $=20$, the compound of Formula $a$ being present in an amount of at least 20% and in an effective amount, and a non-ionic dispersant.

5. Process for imparting a soft handle to textile materials which comprises treating the materials with an aqueous dispersion of a mixture of compounds of the formulae (a) 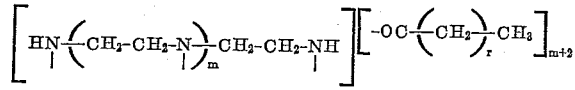

and (b) 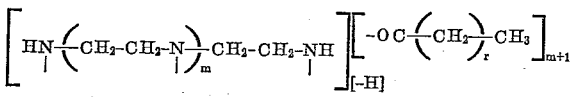

in which $m$ and $r$ are whole numbers, $m$ being at most $=3$, $r$ at least $=12$ and at most $=20$, the compound of Formula $a$ being present in an amount of at least 20% and in an effective amount, dispersing agents of the aqueous dispersion being a non-ionic dispersant and an anion-active dispersant, the latter in an amount of from 0.5 to 10% by weight of the mixture of compounds (a) and (b).

6. Process for imparting a soft handle to textile materials which comprises treating the materials with an aqueous dispersion of a mixture of compounds of the formulae (a) 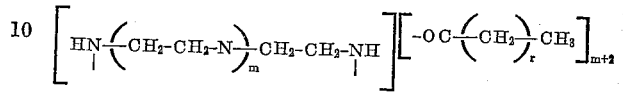

and (b) 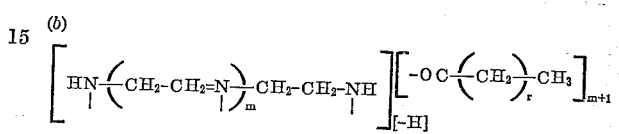

in which $m$ and $r$ are whole numbers, $m$ being at most $=3$, $r$ at least $=12$ and at most $=20$, the compound of Formula $a$ being present in an amount of at least 20% and in an effective amount, dispersing agents of the aqueous dispersion being an adduct of ethylene oxide and a higher alcohol as a non-ionic dispersant and a condensation product of naphthalene sulfonic acid and formaldehyde as an anion-active dispersant, the latter in an amount of from 0.5 to 10% by weight of the mixture of compounds (a) and (b).

7. Process for imparting a soft handle to textile materials which comprises treating the materials with an aqueous dispersion of a mixture of compounds of the formulae (a) 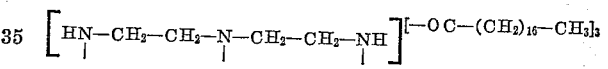

and (b) 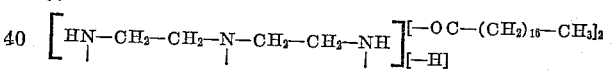

the compound of Formula $a$ being present in an amount of at least 20% and in an effective amount, dispersing agents of the aqueous dispersion being an adduct of ethylene oxide and a higher alcohol as a non-ionic dispersant and a condensation product of naphthalene sulfonic acid and formaldehyde as an anion-active dispersant, the latter in an amount of from 0.5 to 10% by weight of the mixture of compounds $a$ and $b$.

8. An aqueous dispersion suitable for imparting a soft handle to textile materials, of a mixture of compounds of the formulae (a) 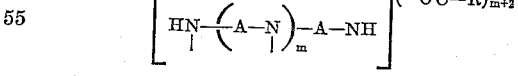

and (b) 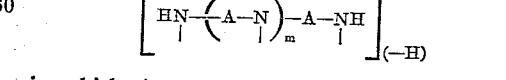

in which A represents a lower alkylene radical, R a higher aliphatic hydrocarbon radical, and $m$ is a whole number of at most 3, the compound of Formula $a$ being present in an amount of at least 20% and in an effective amount.

9. An aqueous dispersion suitable for imparting a soft handle to textile materials, of a mixture of compounds of the formulae (a) 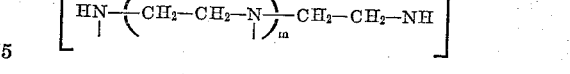

and (b) 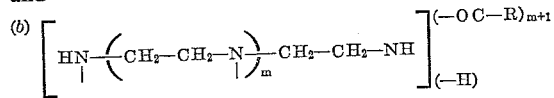

in which R represents a higher aliphatic hydrocarbon radical, and $m$ is a whole number of at most 3, the compound of Formula $a$ being present in an amount of at least 20% and in an effective amount.

10. An aqueous dispersion suitable for imparting a soft handle to textile materials, of a mixture of compounds of the formulae (a) 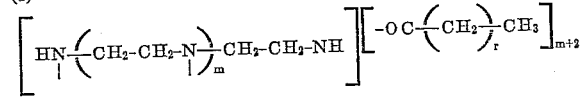

and (b) 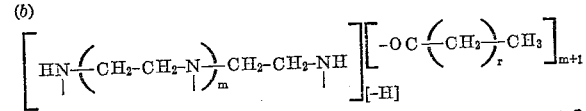

in which $m$ and $r$ are whole numbers, $m$ being at most 3, $r$ at least=12 and at most=20, the compound of Formula $a$ being present in an amount of at least 20% and in an effective amount.

11. An aqueous dispersion suitable for imparting a soft handle to textile materials, of a mixture of compounds of the formulae (a) 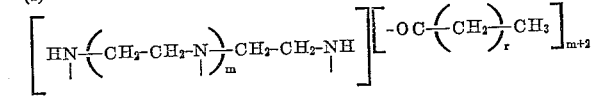

and (b) 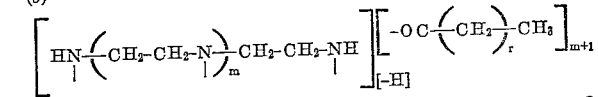

in which $m$ and $r$ are whole numbers, $m$ being at most=3, $r$ at least=12 and at most=20, the compound of Formula $a$ being present in an amount of at least 20% and in an effective amount, and a non-ionic dispersant.

12. An aqueous dispersion suitable for imparting a soft handle to textile materials, of a mixture of compounds of the formulae (a) 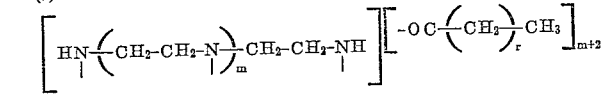

and (b) 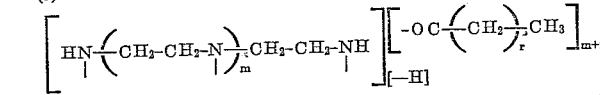

in which $m$ and $r$ are whole numbers, $m$ being at most=3, $r$ at least=12 and at most=20, the compound of Formula $a$ being present in an amount of at least 20% and in an effective amount in said mixture, dispersing agents of the aqueous dispersion being a non-ionic dispersant and an anion-active dispersant, the latter in an amount of from 0.5 to 10% by weight of the mixture of compounds $(a)$ and $(b)$.

13. An aqueous dispersion suitable for imparting a soft handle to textile materials, of a mixture of compounds of the formulae (a) 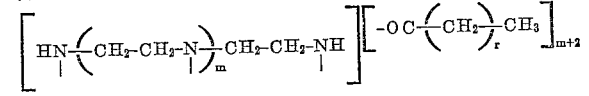

and (b) 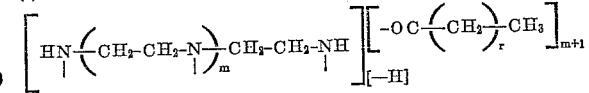

in which $m$ and $r$ are whole numbers, $m$ being at most=3, $r$ at least=12 and at most=20, the compound of Formula $a$ being present in an amount of at last 20% and in an effective amount, dispersing agents of the aqueous dispersion being an adduct of ethylene oxide and a higher alcohol as a non-ionic dispersant and a condensation product of naphthalene sulfonic acid and formaldehyde as an anion-active dispersant, the latter in an amount of from 0.5 to 10% by weight of the mixture of compounds $(a)$ and $(b)$.

14. An aqueous dispersion, suitable for imparting a soft handle to textile materials, of a mixture of compounds of the formulae (a) 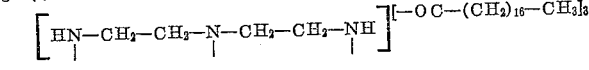

and (b) 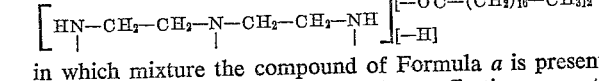

in which mixture the compound of Formula $a$ is present in an amount of at least 20% and in an effective amount, an adduct of ethylene oxide and a higher alcohol as a non-ionic dispersant and a condensation product of naphthalene sulfonic acid and formaldehyde as an anion-active dispersant, the latter in an amount of from 0.5 to 10% by weight of the mixture of compounds $(a)$ and $(b)$.

References Cited in the file of this patent

UNITED STATES PATENTS

| | | |
|---|---|---|
| 2,201,041 | Katz | May 14, 1940 |
| 2,213,477 | Steindorf et al. | Sept. 3, 1940 |
| 2,340,881 | Kelley | Feb. 8, 1944 |
| 2,345,632 | Robinson et al. | Apr. 4, 1944 |
| 2,626,876 | Carnes | Jan. 27, 1953 |
| 2,734,830 | Hagge et al. | Feb. 14, 1956 |

OTHER REFERENCES

Soap and Chemical Specialties, January 1958, page 49.

UNITED STATES PATENT OFFICE
CERTIFICATE OF CORRECTION

Patent No. 3,131,147  April 28, 1964

Armin Hiestand

It is hereby certified that error appears in the above numbered patent requiring correction and that the said Letters Patent should read as corrected below.

Column 8, lines 9 to 13, the left-hand side of the formula reading:

lines 53 to 57, for that portion of the formula reading:

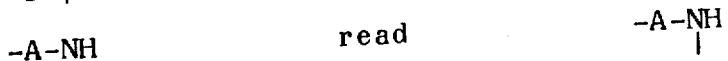

same column 8, lines 72 to 75, column 9, lines 2 to 5, and lines 14 to 17, in the right-hand side of each of the formulae, for that portion reading:

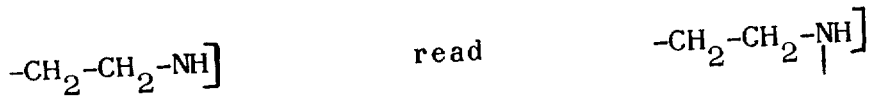

Signed and sealed this 16th day of March 1965.

(SEAL)
Attest:

ERNEST W. SWIDER
Attesting Officer

EDWARD J. BRENNER
Commissioner of Patents